G. B. Hamlin,

Horse Power.

No. 106,483. Patented Aug. 16, 1870.

Witnesses:
C. E. Warren
E. le Ruhill

Inventor:
Geo. B. Hamlin
By atty J. Mc Intire

United States Patent Office.

GEORGE B. HAMLIN, OF WILLIMANTIC, CONNECTICUT.

Letters Patent No. 106,483, dated August 16, 1870.

IMPROVEMENT IN HORSE-POWERS.

The Schedule referred to in these Letters Patent and making part of the same

*To all whom it may concern:*

Be it known that I, GEORGE B. HAMLIN, of Willimantic, of Windham county, in the State of Connecticut, have invented certain new and useful Improvements in "Horse-Powers"; and I do hereby declare that the following is a full and exact description thereof, reference being had to the accompanying drawing making part of this application.

Previous to my invention a variety of mechanical contrivances designated as horse-powers have been devised and employed, the main objects aimed at in all being to provide a simple, cheap, and convenient mechanism by means of which the draft power of a horse or other animal in motion may be imparted in the most economical manner, (that is, with the least loss of power,) to a suitable driving mechanism for operating any kind of machinery.

My invention has for its object to provide a mechanism for the transmission of animal power to a driving-shaft for running all kinds of machinery, which shall be simpler and more convenient for use, and which, at the same time, will economise the motive power more than any other horse-power with which I am familiar; and to these ends, My invention consists in certain new combinations of mechanical devices by which I gain these desirable ends, as will be hereinafter more fully described.

To enable those skilled in the art to make and use my invention, I will proceed to describe it more fully, referring by letters to the accompanying drawing, in which—

Figure 2:
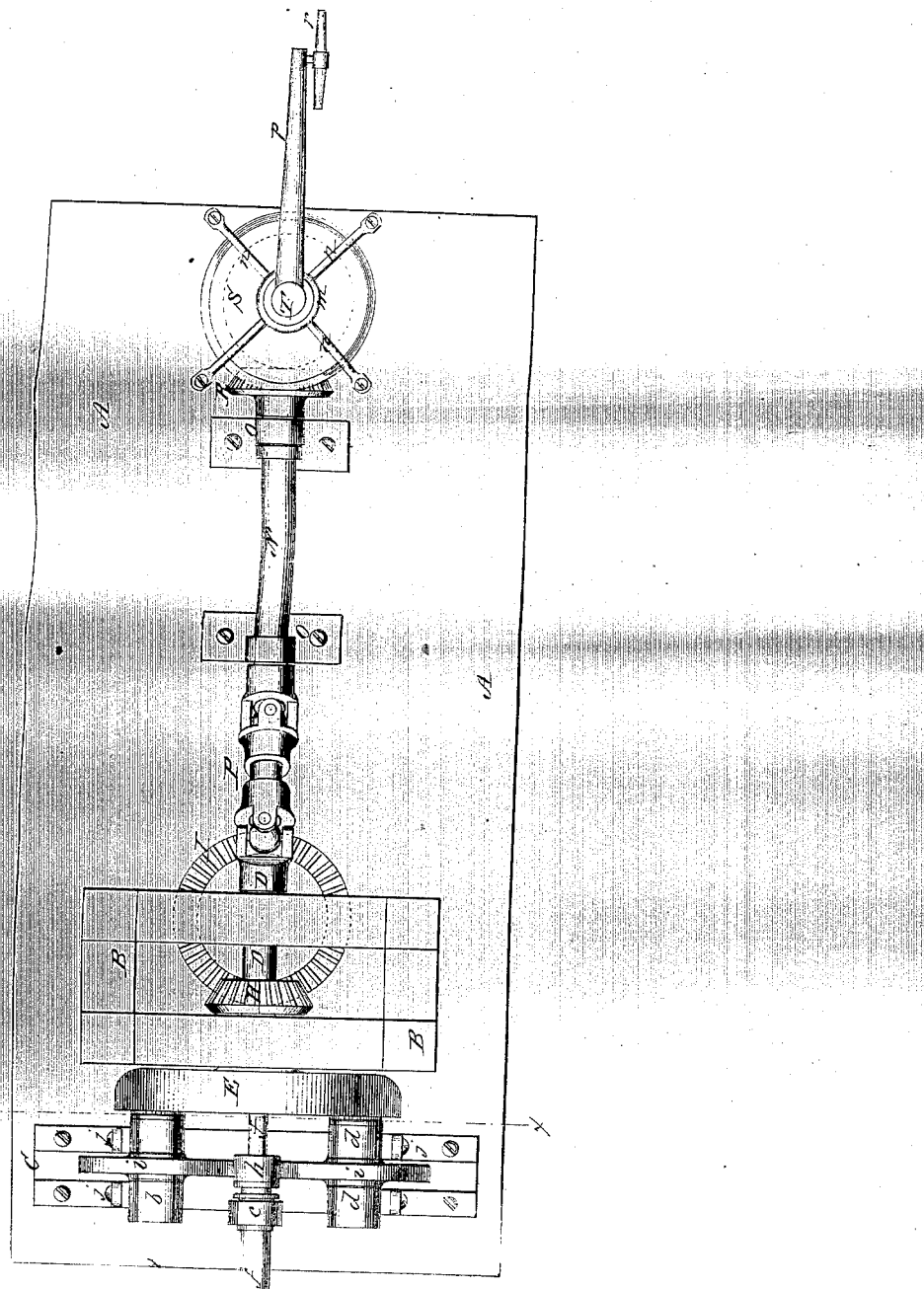
Figure 2 is a top view of the same.
Figure 3:
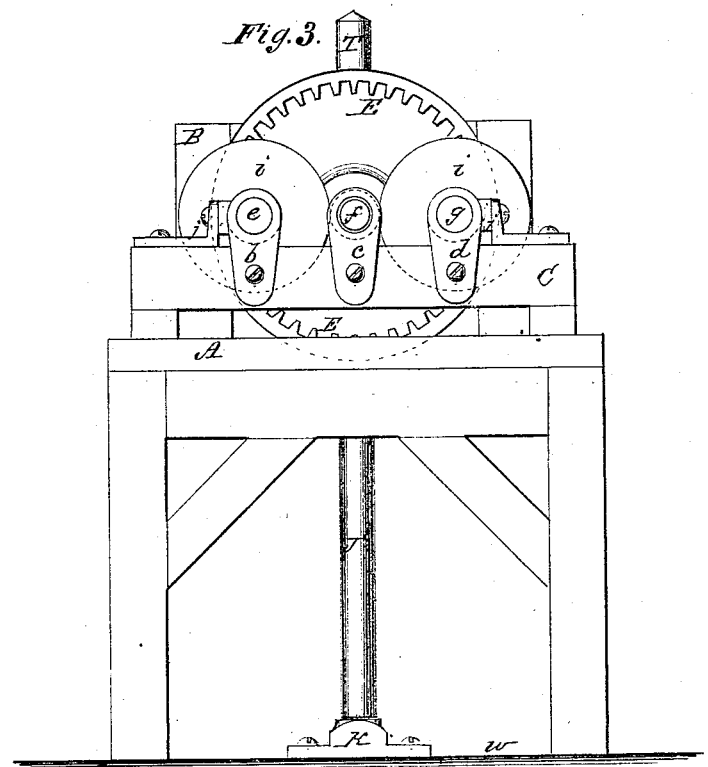
Figure 3 is an end elevation.
Figure 4:
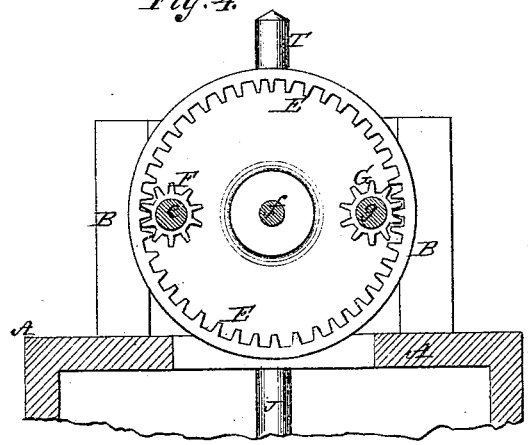

Figure 4, a vertical section at *x x*, fig. 2, of the same.

In the several figures the same part will be found designated by the same letter of reference.

The driving-gearing, or the mechanism through the medium of which the motive power is transmitted at an increased velocity to the shaft from which it is to be applied to the various purposes required, is illustrated as being arranged on a floor or platform, A, and it is mounted in two frames or stands B and C.

Figure 1:
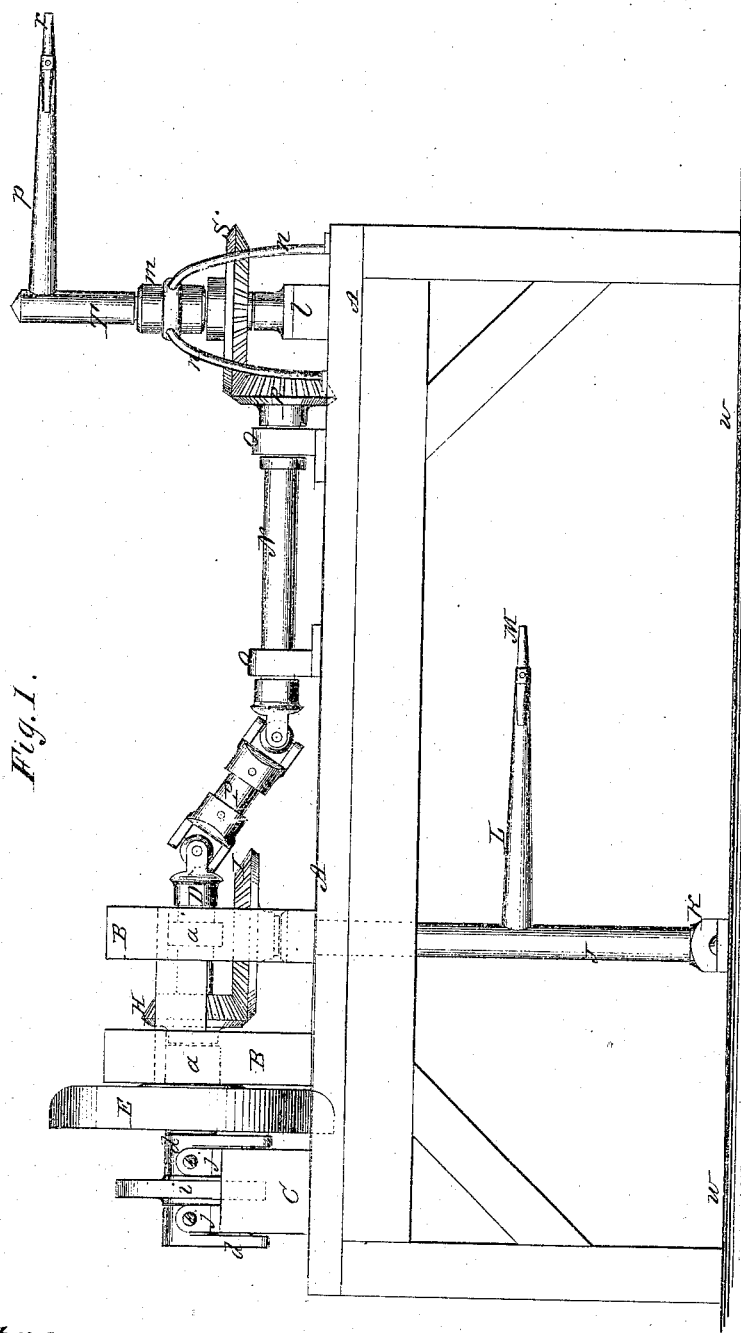
Figure 1 is a side elevation of a horse-power mechanism, made according to my invention.

The frame B has securely fastened to it the two pendent stands or "hangers," *a a*, (seen in dotted lines at fig. 1,) in which is hung, with suitable bearings and boxes, the counter-shaft D, and the frame C supports the boxes or stands *b c d*, in which are mounted the shafts *e, f,* and *g*.

The counter-shaft D carries, on one end, the main driving internal gear E, and the shafts *e* and *g* carry, respectively, the pinions F and G, which mesh into, and are driven by the internal gear E.

On each of the shafts *e g* is keyed a driving friction-pulley or wheel, *i*, and on shaft *f* is a friction-wheel, *h*.

The three wheels *i i* and *h* run in contact, and operate as will be presently explained.

The stands or shaft-boxes *b c d* are all hung so as to be capable of a slight movement toward and from each other, the two marked *b* and *d* having small rubber pads or springs, *j j*, bearing against them, supported by head-blocks, *k*, as clearly illustrated, and operating as will be presently described.

The inner end of shaft *f* takes its bearing in a journal-box or hole formed in the center or hub of the main gear E.

On the counter-shaft D is keyed a bevel-pinion, H, which meshes into (and is driven by) a bevel-gear, I, and this gear I is keyed on to the upper end of what I designate the "auxiliary power-shaft" J, which is supported by, and runs in a suitable bearing-box (near its upper end) bolted to the floor or platform A, and a step bearing at K, (as clearly illustrated,) and which is provided with a sweep or arm, L, to the end of which is attached the usual single-tree M to hitch the animal to.

N is the main power-shaft, which is arranged horizontally immediately over the floor A, in suitable boxes, O O, as seen; at one end it is coupled by a universal joint or ball-coupling to the lower end of the link-shaft P, (which is, by a similar joint, coupled at its upper end to the countershaft D,) and at its other end it is provided with a bevel-pinion, R, which meshes into, and is driven by the bevel-gear S.

The gear S is keyed on a vertical power-shaft, T, which is supported by, and turns freely in, a step bearing, *l*, and a box, *m*, which is sustained by supporting arms or braces, *n*, extending up from the floor A, as clearly illustrated.

The power-shaft T is provided with a suitable sweep or arm, *p*, and a single-tree, *r*, for the application of the animal power.

In the arrangement I have shown, A may be deemed to represent a floor of a barn or building, and the base line at W a lower floor; of course there should be a proper track or bed over the shaft N, and around the shaft T, for the horse to travel on, and the lengths of shafting, &c., should be made to suit the circumstances under which the apparatus is to be used.

The operation, it will be understood, is about as follows:

The animal being hitched to the single-tree *r* of the main sweep *p*, and made to travel in a circle, as usual, the main shaft T is rotated, and with it the bevel-gear S, which drives the pinion R, and thus motion is imparted to the horizontal shaft N. This shaft, through the medium of the link-coupling P, imparts power and motion to the counter-shaft D, which drives the internal gear E, and this gear drives the two shafts e and g, (through the medium of their pinions F G,) in opposite directions. As the said shafts e g rotate with their friction-wheels i i, the latter impart motion to the intermediate friction-wheel h, and by this means the quick shaft f, (from which power is taken for any desired purposed,) is rotated. It will be seen that by the system of gears, and the large friction-wheels i driving the smaller one h, the shaft f is driven at a high velocity, while the main power-shaft T is moved slowly on its axis, and it will be understood that by the use of the intermediate friction-wheel h, on shaft f, as shown, and the movable boxes, as described, the shaft f, which runs at a high velocity, is held in equilibrium, and its bearings relieved of all friction, and that thus a great saving of power over other horse-power mechanisms is effected.

The great advantage of the auxiliary power-shaft, and sweep, J L, extending downward from A to W, as shown, is in rendering the mechanism capable of use under different circumstances, and to permit of the machinery all being put up and worked in an upper story, from whence the driving-belts can pass from shafts f, while the motive power is used below. In a great many instances, especially where economy of room is a consideration, this capacity is of great importance. Where circumstances permit, the main power-shaft and sweep are to be used, and when necessary both may be used together to increase the motive power. The gearing being the same, both sweeps may be worked at the same speed to drive the counter-shaft D in common; and when only one is used, the other of the power-shafts and its gear may be detached, to avoid any loss of power expended in driving the superflous sweep. It will be seen that, while the whole construction and arrangement of my improved horse-power mechanism is simple, durable, and not liable to derangement, the least possible amount of friction is created, and therefore the most economical application of the motive power is gained.

Of course the proportions and the detail construction and arrangement of parts may be varied at the will of the constructor, without departing from the substance of my invention.

Having explained the construction and operation of my improved horse-power, so that one skilled in the art can make and use it,

What I claim as new, and desire to secure by Letters Patent, is—

1. The main driving internal gear, and two or more pinions, with their respective shafts, and provided with suitable friction-wheels, in combination with a central shaft provided with a friction-wheel, the whole arranged to operate substantially as and for the purpose set forth.

2. A driving mechanism, provided with two or more main power-shafts, so arranged that the driving machinery may be located either on the same or a different floor from that where the motor is employed. substantially as hereinbefore set forth.

In testimony whereof I have hereunto set my hand and seal this 16th day of July, 1870.

GEORGE B. HAMLIN. [L. S.]

Witnesses:
WILLIAM R. PATTEN,
J. C. LYFORD.